United States Patent [19]

Lawassani et al.

[11] Patent Number: 4,998,767
[45] Date of Patent: Mar. 12, 1991

[54] VEHICLE SUN VISOR AND METHOD OF MAKING

[75] Inventors: Abdi R. Lawassani, Pontiac; Mark J. Wasik, Alma, both of Mich.

[73] Assignee: United Technologies Automotive, Dearborn, Mich.

[21] Appl. No.: 398,814

[22] Filed: Aug. 25, 1989

[51] Int. Cl.$^5$ ............................................... B60J 3/00
[52] U.S. Cl. ........................................ 296/97.1; 29/453
[58] Field of Search .............. 296/97.1; 160/382, 391, 160/354; 29/453

[56] References Cited

U.S. PATENT DOCUMENTS

| | | | |
|---|---|---|---|
| 2,901,037 | 8/1959 | Herr et al. | 160/354 |
| 3,751,106 | 8/1973 | Mahler et al. | 296/97.1 |
| 4,626,019 | 12/1986 | Tung et al. | 296/97.1 |
| 4,711,483 | 12/1987 | Gulette et al. | 296/97.1 |

*Primary Examiner*—Robert R. Song

[57] ABSTRACT

A sun visor comprises a first visor core half (15), with an integral flange (16) disposed to the first visor core half by an integral hinge (17), bonded to a second visor core half (18), except for the flange, which remains open. Two pieces of suitable material are joined together to form an envelope (10) in the shape of a visor core assembly (9). The visor core assembly is inserted into the envelope, and the material along an open edge of the envelope (38) is inserted into the core and attached along an interior edge (46) of the flange and along an interior edge (48) of the second visor core half. The flange is attached to the second visor core half by use of a plurality of snap fasteners (26, 27, 28), and the closure is further strengthened by inserting a mounting rod (7) into a plurality of aligned apertures (30) defined by a plurality of resilient interdigital bearings (31, 32) mounted to the second visor core half and the flange. A clean, neat seam results along all edges of the envelope.

18 Claims, 3 Drawing Sheets

VEHICLE SUN VISOR AND METHOD OF MAKING

TECHNICAL FIELD

This invention relates generally to sun visors for use in motor vehicles, and more particularly to sun visors having a neat clean seam appearance along the edges thereof, and furthermore, to a method of manufacturing such sun visors.

BACKGROUND ART

The passenger compartments in most motor vehicles are equipped with sun visors which can be positioned against the windshield or a side window to protect the occupants' eyes from the sun. When the visor is no longer required, it can be stored against the headliner of the vehicle. Typically, the sun visor is covered with a material similar to the headliner material or other upholstery in the vehicle so that it blends in with the surrounding material and is esthetically pleasing.

A standard method of assembling sun visors is to mold a visor core in one piece with an integral hinge (living hinge) disposed between two symmetric halves. Various component parts such as a mounting arm are attached to the visor core. Decorative cover material is then applied to the exterior surfaces of the core, and attached thereto by adhesive or an equivalent bonding technique, around the interior edges of the core. The entire assembly is then folded shut by pivoting the covered core halves about the living hinge. The halves are permanently bonded together using a suitable adhesion process such as fusion bonding.

Another method of assembling a sun visor is to first manufacture the visor core in two separate halves. Component parts are attached to the separate halves, and the external surfaces of each half are covered with decorative cover material which is attached by adhesive or an equivalent bonding technique around the interior edges of the halves. The two halves are then permanently bonded together using a suitable adhesion process such as fusion bonding.

In both of the aforementioned prior art methods of visor assembly, the visor core and the decorative cover cannot be separately assembled. Assembling the visor core separately from the decorative cover would eliminate a step from such prior art assembly processes; the decorative cover material would not have to be attached around all the interior edges of the visor core prior to assembly of the core. Eliminating a step from the visor assembly process would reduce the time required for assembly, and the reduced time and material required for assembly would reduce the cost of manufacturing the visor. Separate assembly of the core and the decorative cover would also allow the preassembly of the decorative cover with neat, clean seams rather than the less attractive appearance of material clamped between two visor core halves. Provision of a sun visor with the refined appearance of neat, clean seams is important in the luxury automobile industry because of the intense competition for sophisticated and demanding consumers.

DISCLOSURE OF INVENTION

Objects of the present invention include the provision of a vehicle sun visor, with the refined appearance of neat, clean and finished seams on a pre-seamed outer decorative cover, which can be easily manufactured and assembled.

According to the invention, a visor core is provided with an integral flange along an edge of the core, the area between the flange and a rigid portion of the core defining a cavity. The core is received within a pre-seamed decorative cover envelope for retention of the visor core therein. Envelope material along an opening therein is retained in the cavity by fixing the flange to the rigid portion by a suitable means such as snap fasteners.

The decorative cover envelope is constructed by joining two pieces of a selected material, with the reversed side exposed, along a continuous seam, to form an open envelope in the shape of the visor core. The envelope is then turned right-side-out with the finished side exposed. An open edge of the envelope coincides to the edge of the core having the flange. The visor core assembly is then completely inserted into the envelope, and the material along the open edge of the envelope is folded into the cavity, and joined along the interior edges of the cavity by a suitable adhesion process. The flange is then pivoted so that snap fasteners on the flange and the rigid portion of the core permanently engage.

The foregoing and other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
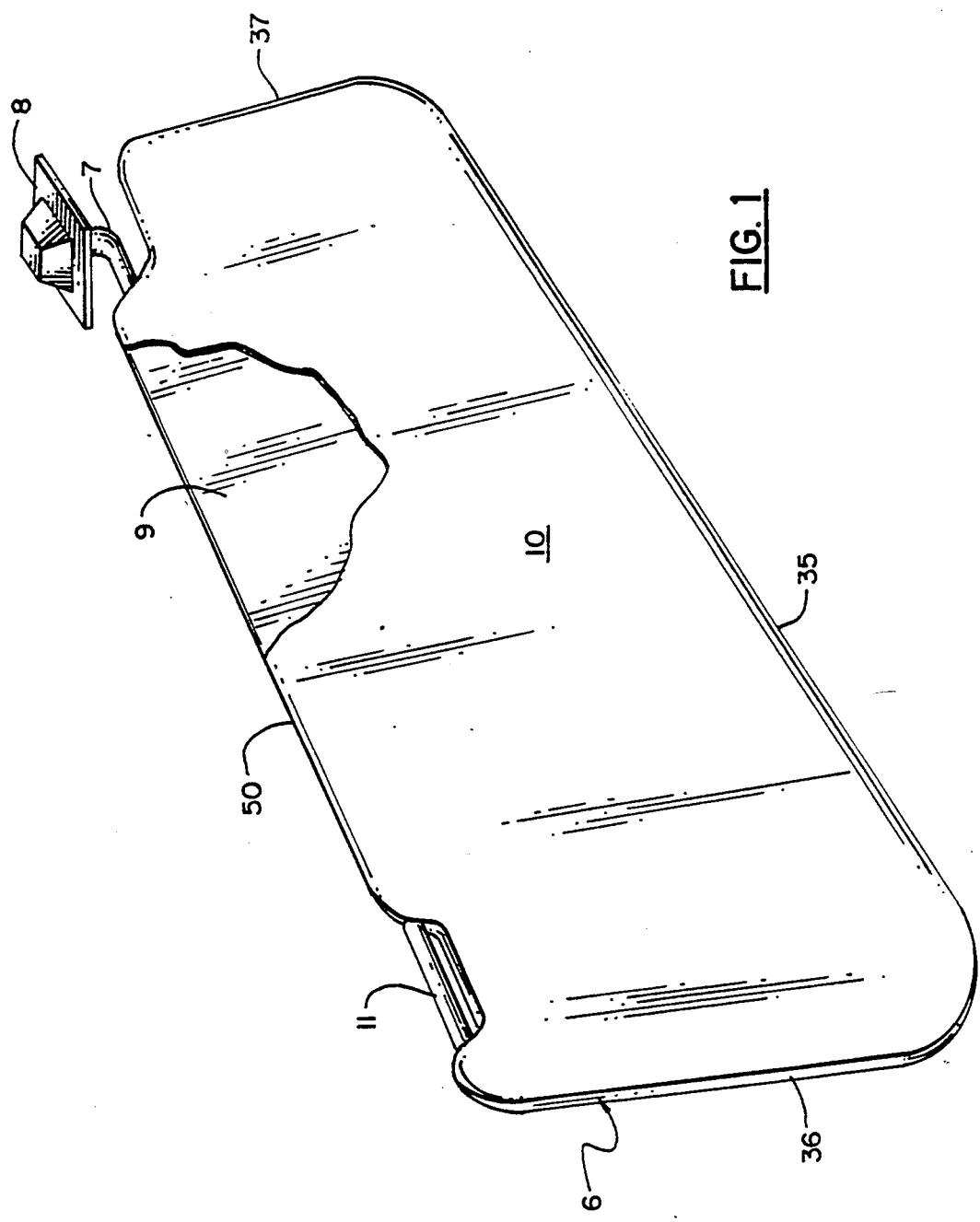
FIG. 1 is a perspective view of a sun visor in accordance with the present invention.

Referring to FIG. 1, a sun visor 6 is mounted on a pivot rod 7 which is fastened to a vehicle roof (not shown) by a bracket 8. The sun visor comprises a visor core assembly 9 retained in a pre-seamed decorative cover envelope 10. A cylindrical roller sleeve (roller bearing) 11 is provided, as described and claimed in commonly-owned copending U.S. patent application Ser. No. 07-398,586, filed contemporaneously herewith, entitled "Vehicle Sun Visor Catch". The roller sleeve mounts the visor to a headliner mounting clip (not shown).

Figure 2:
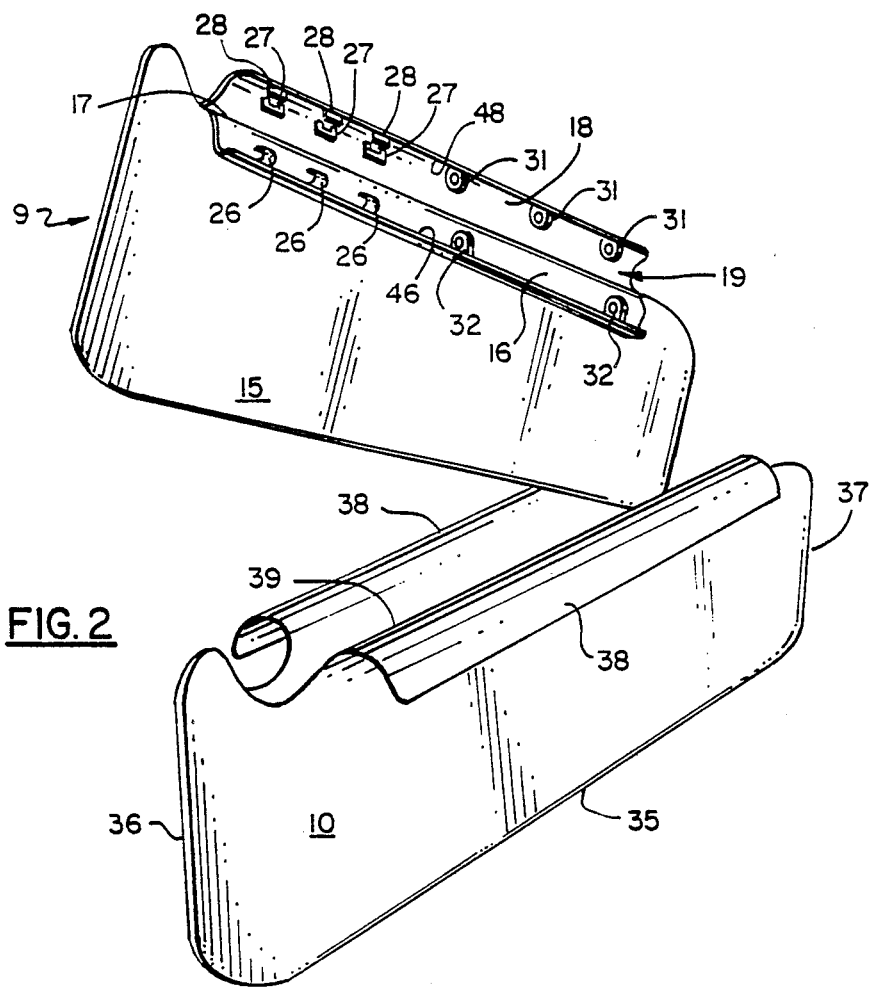
FIG. 2 is an exploded view of a visor core assembly being inserted into a decorative cover envelope, with a flange in the visor core shown open.

Referring to FIG. 2, a first visor core half 15 is molded of a suitable material such as polypropylene, with an integral flange 16 movable about an integral hinge 17 (living hinge). A second visor core half 18 is bonded to the first visor core half 15 by a suitable adhesion process such as hot-plate fusion, except for the flange 16, which remains open. The bonded core halves 15,18 form the visor core assembly 9. The area between the flange 17 and the second visor core half 18 defines a cavity 19.

Figures 4, 5:
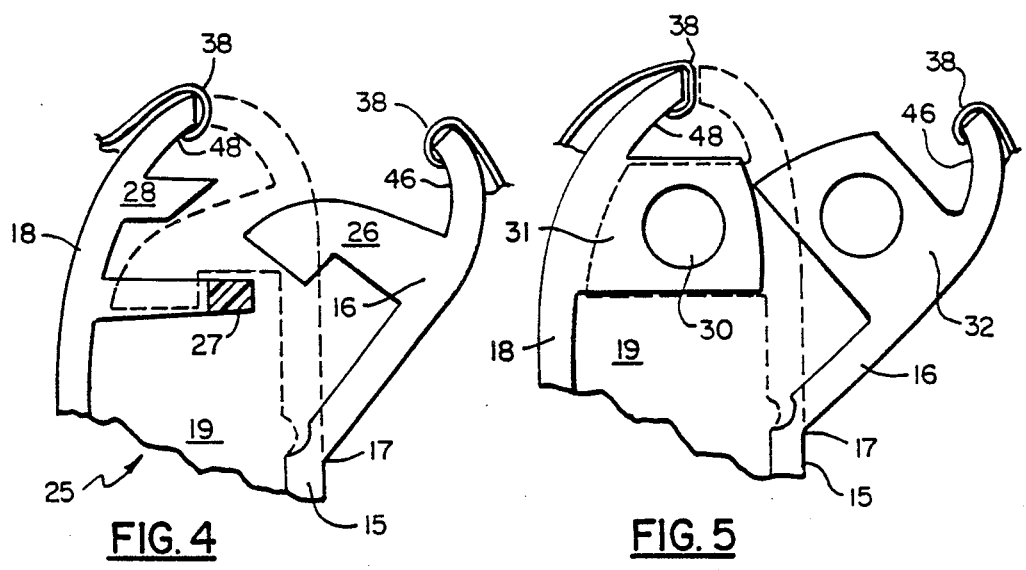
FIG. 4 is a sectional view taken in the direction of line 4—4 of FIG. 3.
FIG. 5 is a sectional view taken in the direction of line 5—5 of FIG. 3.

Referring to FIG. 4, ultimately, flange 16 is permanently attached to the second visor core half 18 by a plurality of snap fasteners 25. The snap fasteners 25 are located in the cavity 19 and each comprise a resilient L-shaped dog 26 molded to the flange 16, a resilient slotted plate 27 molded to the second visor core half 18, and a resilient wedge shaped locking tab 28 molded adjacent to each slotted plate 27. In FIG. 5, the permanent attachment of the flange 16 to the second visor core half 18 is further accomplished by the insertion of the rod 7 into a plurality of aligned apertures 30 defined by a plurality of resilient interdigital bearings 31 molded to the second visor core half 18 and a plurality of resilient interdigital bearings 32 molded to the flange 16.

Referring to FIG. 2, a suitable material such as leather, polyvinal chloride, or cloth with a foamed backing is used to make the pre-seamed decorative cover envelope 10. The envelope is constructed by a suitable cut and seal technique such as laser cutting the material to the shape of the visor core and subsequently ultrasonically welding the material on the reverse side along a bottom seam 35 and two side seams 36 and 37. Skirts 38 defines an opening in the envelope for insertion of the core thereinto. The envelope 10 is then turned right-side-out with the finished side exposed. The interior of the envelope 39 can be accessed through the open skirts 38. The exposed seams 35, 36, and 37 have a high quality, finished appearance. The continuous tailored appearance of the seams is far superior to the appearance of a seam created by clamping material in between two visor core halves because the tailored seam appears tighter and better defined, while the seam created by clamping the material between two visor core halves forms a deep V-shaped channel between the visor core halves at the seam.

Figure 3:
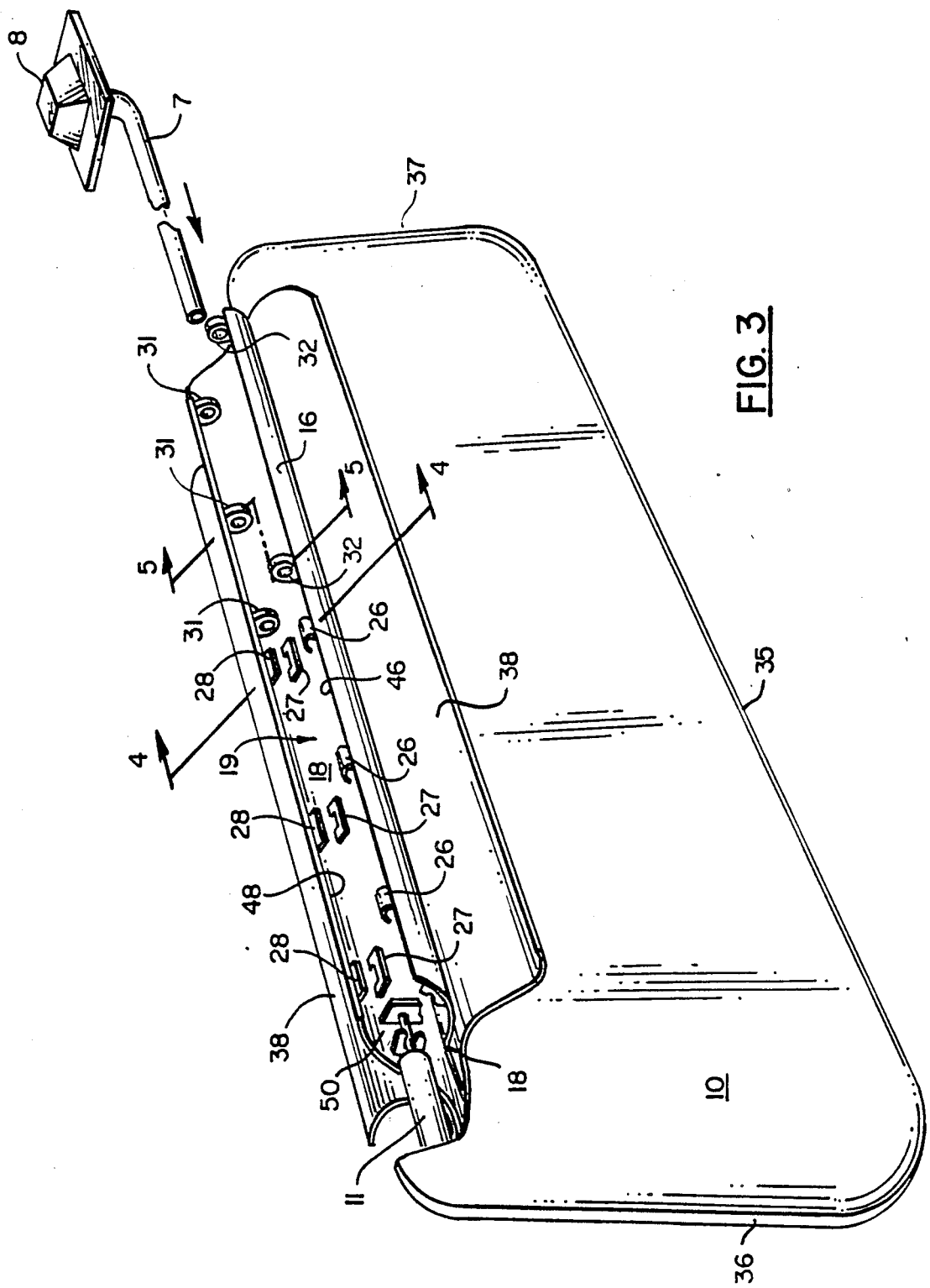
FIG. 3 is a perspective view of the visor core completely inserted into the decorative cover envelope.

The visor core assembly 9 is then inserted into the interior of the envelope 39 as shown in FIG. 2, until the core is completely inserted as shown in FIG. 3. In FIGS. 3, 4, and 5 the skirts 38 are folded over the flange 16 and the second visor core half 18 into the cavity 19, and attached thereto along interior edges 46 and 48 by adhesive or equivalent technique.

Referring to FIGS. 1 and 3, a pin 50 and the cylindrical roller sleeve 11 are then installed according to the aforementioned application. In FIG. 4, the flange 16 is pivoted about the living hinge 17 until the dogs 26 become completely engaged with the plates 27 so that the ends of the dogs are received in the slots. The dogs 26 are secured in place by the locking tabs 28. The locking tabs 28 act against the dogs 26 so that the ends of the dogs remain inserted in the slots.

Referring to FIGS. 3 and 5, the rod 7 is then inserted into the plurality of aligned apertures 30 of the interdigital bearings 31,32. The rod may have a metal clip or the like (not shown) fastened thereto to assist in holding it in position. This arrangement provides further strength to the visor assembly 9, and additional locking of the flange 16 to the second visor core half 18.

Referring to FIGS. 1,4 and 5, once the flange 16 is permanently attached to the second visor core half 18, the material on the skirts meet to make a clean seam appearance along a seam at the mounting edge 50 of the visor 6, as shown in FIG. 1.

As illustrated, the envelope used to cover the visor core assembly is made of two pieces of material. However, there are other suitable means of forming the cover in accordance with the present invention such as folding a piece of material with two symmetric halves in the shape of the visor core and joining two side seams, thereby forming an envelope. An envelope could also be formed by injection molding an envelope of suitable material.

The visor core assembly is shown assembled from two separate halves. There are other suitable ways of manufacturing the visor core such as molding a core in one piece with a flange attached thereto by a living hinge along the mounting edge.

There are also a number of processes, equivalent to hot plate welding, suitable for permanently bonding the first and second visor core halves. For example, bonding could be achieved by applying a fast drying adhesive to each half prior to assembly of the halves. Similarly, the seams on the decorative cover could be joined using an adhesive or stitching with a thread rather than by sonic sealant welding.

The snap fastners 26,27,28 and the interdigital bearings 31,32 are shown molded to the visor core. However, there are other suitable means of mounting the snap fasteners and the interdigital bearings to the core in accordance with the present invention such as bonding with a fast drying adheasive or attachment with rivets or screws. In addition, the permanent attachment of the flange to the second visor core half can be achieved using any permanent joining method rather than the mechanical catches described herein.

Although the invention has been shown and described primarily with respect to an exemplary embodiment thereof, it should be understood by those skilled in the art, that various changes, omissions and additions may be made such as those set forth hereinabove, without departing from the spirit and the scope of the invention.

I claim:

1. A sun visor for use in motor vehicles comprising:
   a visor core; and
   a covering material;
   characterized by:
   said core including an elongate integral flange formed along an edge portion of the visor core, said flange being engageable with a confronting rigid portion of the visor core;
   said covering material preformed into an envelope in the shape of the exterior of said core, the envelope further having an open edge coincident to said flange;
   said core being received within the open envelope; and
   material along the open edge of said envelope being retained between said core and said flange.

2. Apparatus according to claim 1 further characterized by said core including an integral hinge parallel to a mounting edge of said core, whereby said flange pivots about said hinge to contact said core at the mounting edge.

3. Apparatus according to claim 1 further characterized by said material along the open edge of the envelope being permanently bonded along an interior edge of said flange and an interior edge of said core.

4. Apparatus according to claim 1 further characterized by said flange being attached to said core by a plurality of snap fasteners.

5. Apparatus according to claim 4 further characterized by said snap fasteners each comprising a resilient L-shaped dog mounted to said flange, the L-shaped dog being received within a resilient slotted plate mounted to said core, the L-shaped dog being held in the resilient slotted plate by a resilient wedge shaped locking tab mounted adjacent to the slotted plate.

6. Apparatus according to claim 1 further characterized by said material covering the core being a textile fabric.

7. Apparatus according to claim 6 further characterized by said textile fabric being a cloth having a foamed backing.

8. Apparatus according to claim 1 further characterized by said material covering the core being leather.

9. Apparatus according to claim 1 further characterized by said material covering the core being polyvinal chloride.

10. Apparatus according to claim 1 further characterized by a plurality of resilient interdigital bearings mounted to said flange and said core, the bearings defining a plurality of aligned apertures when said flange is permanently attached to said core, the aligned apertures receive a mounting rod therethrough, thereby providing further strength and additional locking of said flange to said core.

11. Apparatus according to claim 1 further characterized by said visor core comprising:
a first half, said first half including said flange; and
a second half bonded to said first half.

12. Apparatus according to claim 1 further characterized by said core comprising molded synthetic material.

13. Apparatus according to claim 12 further characterized by said synthetic material being polypropylene.

14. A method of manufacturing a sun visor for use in a motor vehicle characterized by:
providing a core having a flange and an adjacent recess therein;
forming an open visor decorative cover envelope in the shape of the core;
inserting the core into the envelope;
inserting material along the open side of the envelope into said recess of said core;
bonding said material to an interior edge of said flange and an interior edge of said core;
attaching said flange to said core.

15. The method according to claim 14 further characterized by said envelope being formed by attaching two pieces of material along a continuous seam.

16. The method according to claim 15 further characterized by said material being attached along said seam by ultrasonic sealant welding.

17. The method according to claim 14 further characterized by said core comprising first and second core halves bonded together prior to insertion into said envelope.

18. The method according to claim 17 further characterized by said first and second halves being bonded together by hot plate welding.

* * * * *